Figure 1:
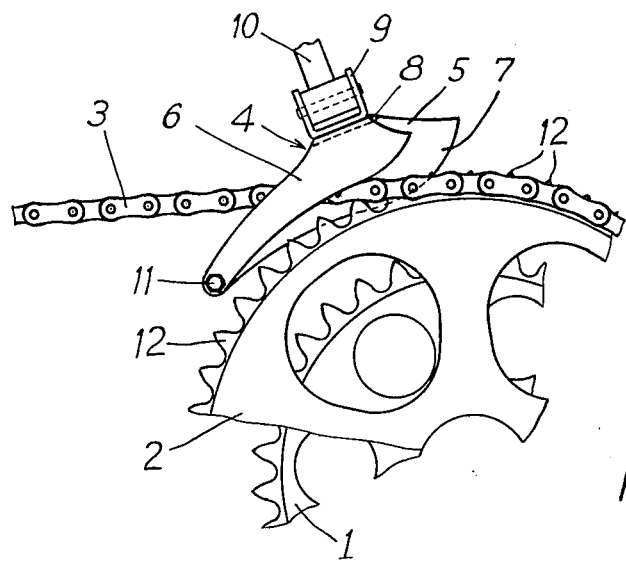

United States Patent [19]
Huret

[11] 4,078,444
[45] Mar. 14, 1978

[54] FRONT DERAILLEUR CHAIN GUIDE

[76] Inventor: Jacques André Huret, 12, rue C.B. Metman, Neuilly sur Seine, France, 92200

[21] Appl. No.: 766,736

[22] Filed: Feb. 8, 1977

[30] Foreign Application Priority Data

Feb. 13, 1976   France ........................ 76 04038

[51] Int. Cl.$^2$ ............... F16H 7/18; F16P 1/00
[52] U.S. Cl. ............................ 74/240; 74/611
[58] Field of Search ........................... 74/240, 611

[56] References Cited
U.S. PATENT DOCUMENTS

| | | | |
|---|---|---|---|
| 2,770,142 | 11/1956 | Margrey | 74/240 |
| 3,184,993 | 5/1965 | Swenson | 74/611 |
| 3,885,471 | 5/1975 | Morine et al. | 74/611 |

*Primary Examiner*—Leonard H. Gerin
*Attorney, Agent, or Firm*—Weingarten, Maxham & Schurgin

[57] ABSTRACT

A front derailleur chain guide for a bicycle comprises a first branch and a second branch substantially parallel and joined to one another by a bridge connecting a portion of the top edges of each of the branches. An additional member is attached to the outer face of the first branch situated on the side where a smaller sprocket wheel is disposed. The additional member is fixed to the first branch and has elasticity such that it can move slightly away from the branch when the chain comes to bear against a portion of the additional member which projects forwardly of the first branch.

13 Claims, 11 Drawing Figures

U.S. Patent  March 14, 1978  Sheet 1 of 3  4,078,444

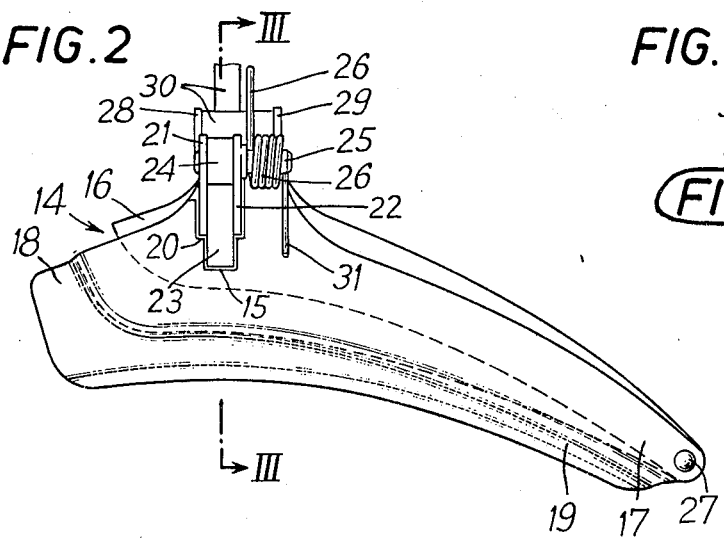
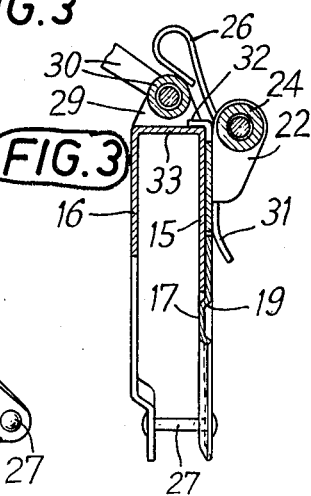
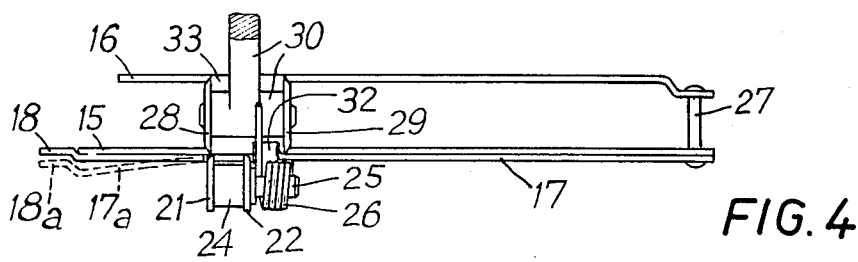
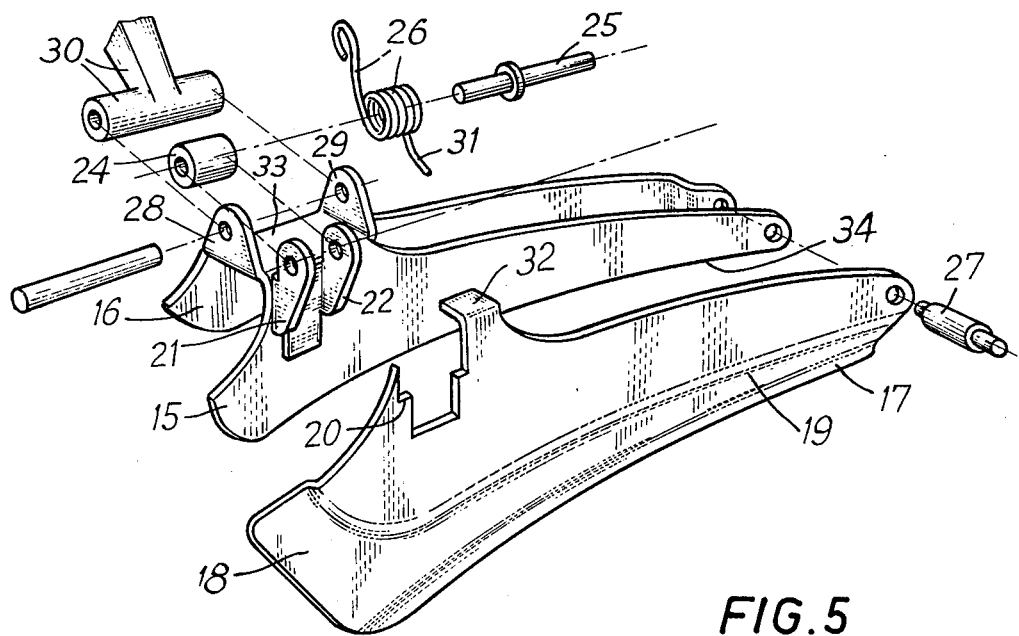

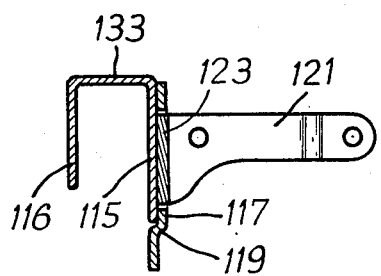
FIG.7
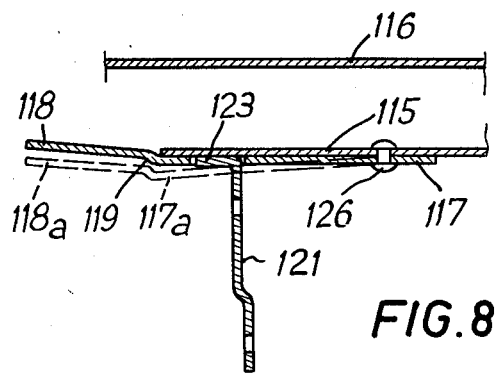
FIG.8
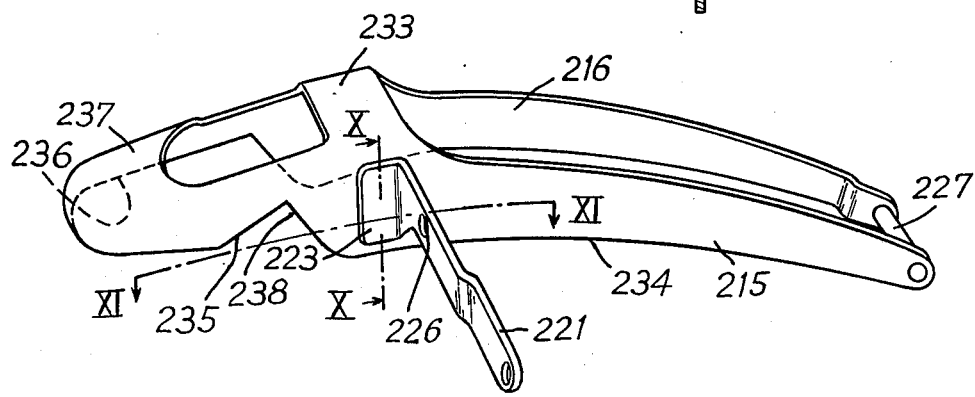
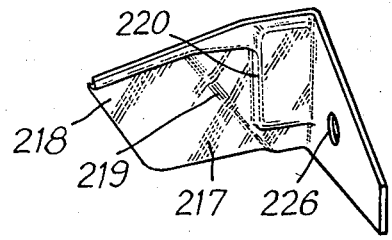
FIG.9
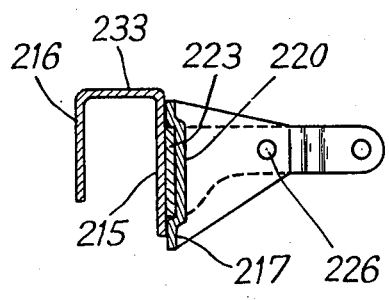
FIG.10
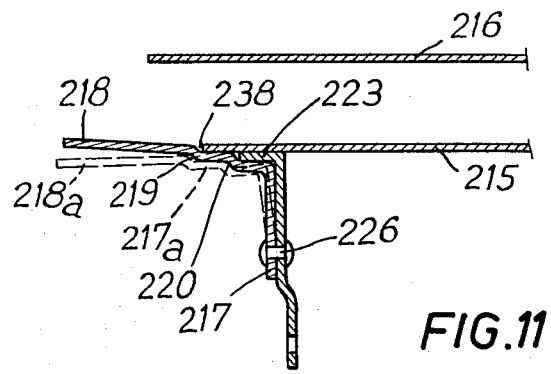
FIG.11

FRONT DERAILLEUR CHAIN GUIDE

The present invention relates to front derailleur chain guides for bicycles. A conventional derailleur chain guide for a bicycle equipped with a multi-sprocket wheel crank gear, is intended to guide the chain over one or the other of two crank gear sprocket wheels and is of the type comprising a first branch and a second branch which are substantially parallel and each of which is composed of a rigid body in the form of an elongated plate curved in the longitudinal direction, these branches being spaced apart so as to form between them a free space larger than the width of the chain and being joined to one another by a bridge connecting a portion of the top edges of each of these plates, while the second branch situated on the side where the largest sprocket wheel is disposed is slightly off-set in height in relation to the first branch in such a manner that during operation it can come above the largest sprocket wheel without touching it.

A conventional front derailleur chain guide of this type is displaceable laterally under the action of the derailleur mechanism and can be secured in different positions corresponding to the different sprocket wheels of the crank gear.

A particular problem arises when it is desired to pass the chain from a small sprocket wheel to the largest sprocket wheel, particularly when the difference in diameter of the sprocket wheels is considerable. The derailleur chain guide originally situated above a small sprocket wheel is displaced laterally towards the largest sprocket wheel under the action of the derailleur mechanism. The chain is then pushed laterally by the branch of the derailleur chain guide which is situated on the side where the smallest pinion is disposed, which branch will be called the first branch, while the branch of the derailleur chain guide situated on the side where the largest sprocket wheel is disposed, or second branch, which is slightly offset in height in relation to the other branch, avoids contact with the largest sprocket wheel and can move beyond the plane containing the latter. In proportion as the median plane of the chain guide progresses from the plane containing the small sprocket wheel to the plane containing the large sprocket wheel, the chain is guided by the first branch in the direction of the largest sprocket wheel and the links of the chain rubbing against the first branch are raised in relation to the sprocket wheel of smaller diameter, follow the curvature of the branch to arrive level with the front part of the branch situated facing the highest teeth of the sprocket wheel of larger diameter, and finally engage over the highest teeth of the said sprocket wheel of larger diameter. Nevertheless, the links of the chain are very frequently wedged between the said first branch and the highest teeth of the largest sprocket wheel, so that the operation of the gear change lever becomes particularly difficult. The first branch cannot in fact always have the desired flexibility, particularly when it must be of great height, as is the case when the ratio between the diameters of the smallest sprocket wheel and that of the largest sprocket wheel is high.

The present invention seeks to overcome the disadvantages indicated above and to provide an improved front derailleur chain guide which ensures easy gear changing and in particular makes it possible to pass the chain from a small sprocket wheel to the largest sprocket wheel without any risk of wedging the chain links between the chain guide and the sprocket wheel teeth.

According to the present invention there is provided a front derailleur chain guide comprising: a first branch and a second branch which are substantially parallel and each of which consists of a rigid body in the form of an elongated plate curved in the longitudinal direction and spaced apart from one another in such a manner as to form between them a free space larger than the width of a chain, and joined to one another by a bridge connecting a part of an edge of each branch, the second branch, being offset in relation to the first branch in such a manner as to be able during operation to come above a larger sprocket wheel without touching it, the first branch having a further member which projects at least forwards of and/or below a front portion of the first branch and to which a certain elasticity is imparted so that it can move slightly away from the first branch when the chain comes to bear against the said further member.

In a particular embodiment of the invention the further member comprises a part of an additional piece attached to an outer surface of the first branch.

The further member may cover the entire surface of the first branch to which it is attached. Alternatively the further member may only partly cover the surface of the first branch to which it is attached.

The further member may have a front end slightly inclined inwards in relation to the said first branch.

In a first embodiment of the invention the additional piece is rigid, is fixed to the first branch at a point remote from a leading portion thereof, is free at its leading portion which constitutes the said further member, and is subjected, in its median zone, to elastic pressure applied by a spring.

In another embodiment of the invention the additional piece is flexible, is free at a leading part thereof, and is fixed to the first branch at a point remote from a leading end of the first branch.

The first and second branches may have their top edges joined by a bridge at a leading end. The bridge may constitute a curved beak.

This feature is particularly advantageous for reasons of safety. In conventional arrangements the front ends of the two branches of the front derailleur chain guide form in fact two projecting edges which may cause injury in the event of an accident. In the chain guide of the invention, on the other hand, when the two branches of the chain guide are joined at their front end, they may form a harmless rounded head. Moreover, the passing of the chain onto the different sprocket wheels remains easy because the additional part of the first branch has a certain elasticity and can move slightly away from the body of the first branch when the chain comes to bear against the latter, thereby eliminating or reducing risk of wedging.

According to yet another embodiment of the invention the additional piece, which has a certain flexibility, is free at its leading part and has a trailing part curved in the form of a wing fixed on a lug rigid with the first branch.

According to another embodiment of the invention the first branch is composed of a single piece whose body is formed from a stiffened steel, and the further member is formed from a flexible steel, and a portion of the boundary between the body and the first branch being slit or notched.

Figure 6:
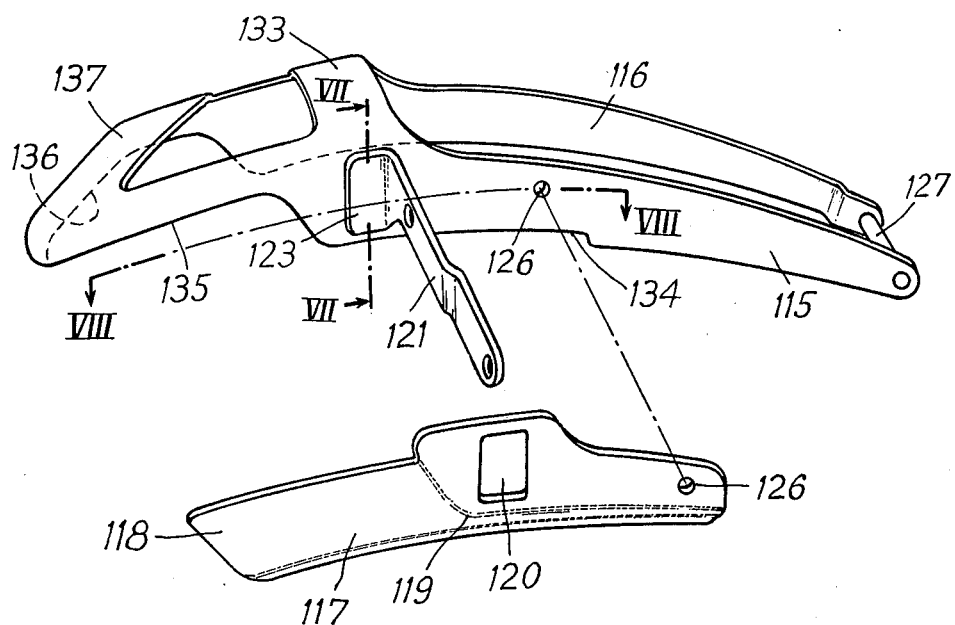

The invention is illustrated, merely by way of example, in the accompanying drawings, in which:

FIG. 1 is a view in elevation of a conventional front derailleur chain guide which is mounted above sprocket wheels of a bicycle crank gear, FIG. 2 is a view in elevation of a first embodiment of a front derailleur chain guide according to the present invention, FIG. 3 is a view in section of the derailleur chain guide of FIG. 2, taken on the line III—III, FIG. 4 is a plan view of the derailleur chain guide of FIG. 2, FIG. 5 is an exploded perspective view of the derailleur chain guide of FIGS. 2 to 4, FIG. 6 is an exploded perspective view of a second embodiment of a front derailleur chain guide according to the present invention, FIGS. 7 and 8 are sectional views of the derailleur chain guide of FIG. 6, taken on the lines VII—VII and VIII—VIII respectively, FIG. 9 is an exploded view in perspective of a third embodiment of a front derailleur chain guide according to the invention, and FIGS. 10 and 11 are sectional views of the chain guide of FIG. 9 taken on the planes X—X and XI—XI respectively.

In the following description the references "top", "bottom", "front" etc., refer to the directions seen in the drawings.

Referring to FIG. 1 there is shown a known derailleur chain guide 4 mounted above a small sprocket wheel 1 and a large sprocket wheel 2 of a bicycle crank gear. The sprocket wheels 1, 2 are designed to receive a chain 3. A derailleur operating mechanism controlling the displacement of the chain guide and also the fastening of that mechanism to a frame of a bicycle are not shown. The chain guide 4 is composed of a first branch 5 situated on the side where the small sprocket wheel 1 is disposed, and a second branch 6 situated on the side where the large sprocket wheel 2 is disposed. The two branches 5, 6 are composed of two elongated rigid plates which are curved in the longitudinal direction with a downwardly turned concavity, and they are substantially parallel to one another and spaced apart in such a manner as to form between them a free space larger than the width of the links of the chain 3. The branch 6 is slightly offset in height in relation to the branch 5, so as to be able to be displaced above the sprocket wheel 2 without touching it. The branch 5 has a front portion 7 which extends beyond the front end of the branch 6. A bridge 8 connects the top edges of the branches 5, 6. A U-shaped member 9 is fixed on the bridge 8. An end 10 of the derailleur operating mechanism is mounted for pivoting in the member 9. The two branches 5, 6 are connected at their bottom rear end by a spacer fixed by a bolt 11, at a point situated below, a plane tangential to the upper portion of the sprocket wheel 1.

When the chain guide 4 is moved perpendicularly to the plane of FIG. 1, in the forward direction, for the purpose of passing the chain 3 from the sprocket wheel 1 to the sprocket wheel 2, the links of the chain 3 are pushed by the branch 5, are driven towards the front of the branch 5, and arrive in a zone of the branch 5 opposite which teeth 12 of the sprocket wheel 2 pass. If the derailleur mechanism has been operated too abruptly or if the front portion 7 of the branch 5 is too rigid, the links of the chain will then tend to become wedged between the branch 5 and the teeth 12 of the sprocket wheel 2. Considerable resistance is thus set up and the gear change cannot be made smoothly.

A first embodiment of a front derailleur chain guide 14 according to the present invention is shown in FIGS. 2 to 5. A derailleur operating mechanism and fastenings for that mechanism to the bicycle frame may be of various types and are not illustrated. The chain guide 14 is mounted above the sprocket wheels 1, 2 of the crank gear in conventional manner. A first branch 15 and a second branch 16 situated respectively on the side where the sprocket wheel 1 is disposed and on the side where the sprocket wheel 2 is disposed have substantially the same configuration as the branches 5, 6 of the conventional chain guide shown in FIG. 1. However, the branch 15 has a length which is slightly different from that of the branch 16. The branch 16 is slightly offset in height in relation to the branch 15 so as to be able to move above the sprocket wheel 2 without touching it.

An attachment piece or rigid plate 17 is attached on the branch 15 and covers the latter on its outer face, while extending the branch 15 at its lower portion and front portion. The plate 17 thus constitutes an extension 18 forward of the branch 15. The plate 17 matches the shape of the branch 15 and at the level of a bottom edge 34 of the branch 15 has a step 19, so that the portion of the inner face of the plate 17 which is situated below the step 19 is in line with the inner face of the branch 15 when in the position of rest (FIG. 3). The bottom edge of the plate 17 may be slightly raised towards the outside. The extension 18 of the plate 17 is also situated in line with the branch 15, or is preferably slightly incurved towards the interior of the chain guide (FIG. 4). The plate 17 is fixed to the branch 15 at its rear end by a bolt 27. The plate 17 is, in addition, provided with a projection 32 which rests on a bridge 33 connecting the top edges of the branches 15, 16. Furthermore, a spring 26 applies elastic pressure to the plate 17 at a point 31 situated in the median portion of the plate 17 and remote from the extrusion 18. The elastic pressure applied to the plate 17 may be obtained in various ways, and the arrangement of the spring 26 in FIGS. 2 and 5 is shown only as an example. In the particular example illustrated in FIGS. 2 to 5 the plate 17 is provided with a cutout 20 through which pass two lugs 21 and 22 mounted on a part 23 fixed on the branch 15 below the bridge 33 and serving to support a pin 25. A cylindrical washer 24 is mounted on the pin 25 between the two lugs, while the spring 26 is mounted on an extension of the pin 25 outside the lugs 21, 22.

An end 30 of the connector for the derailleur operating mechanism is mounted for pivoting on two parts 28, 29 fixed on the bridge 33. The derailleur operating mechanism may be of any known type, for example of the parallelogram type.

The operation of the chain guide will be explained with reference to FIGS. 2 and 4. When for the purpose of changing gear the chain has to pass from the sprocket wheel 1 to the sprocket wheel 2, the chain guide is moved in a direction at right angles to the plane of FIG. 2, towards the rear. The branch 15 and the plate 17 then comes into contact with the chain 3 and moves the links of the latter against the teeth of the sprocket wheel 2. At the moment when the chain arrives at the level of the highest teeth of the sprocket wheel 2 the extension 18 of the plate 17, against which the links of the chain 3 are then bearing, moves away because of the elasticity provided by the spring 26 and comes into a position 18a shown in FIG. 4. The retracted position of the plate 17 as a whole is shown in broken lines in FIG. 4 and given the reference 17a.

Similarly, the portion of the plate 17 which is situated below the step 19 has a certain flexibility due to the spring 26 and can move slightly outwards in order to prevent the chain from being jammed against the teeth of the sprocket wheel 2 when it has to pass from the sprocket wheel 1 to the sprocket wheel 2. The bottom portion of the plate 17, which projects and extends over the entire length of the branch 15, is more particularly useful when the ratio between the diameters of the sprocket wheel 2 and sprocket wheel 1 is high and the chain 3 has to move over a considerable space in order to pass from one sprocket wheel to the other.

FIGS. 6 to 8 show a second embodiment of a derailleur chain guide according to the present invention. In this embodiment the chain guide is composed of two branches 115, 116, which fulfil the functions of the branches 15, 16 respectively in the chain guide of FIGS. 2 to 5, and of an attachment piece or plate 117 attached to the branch 115. The plate 117 has a certain elasticity firstly because of the steel of which it is composed and secondly because of its thickness. The plate 117, which covers the branch 115 only partially, is fixed by its rear part to the median part of the branch 115 with the aid of a connecting element 126, which may for example be a rivet. A cutout 120 is provided in the plate 117. A strap 121 is fixed by its heel 123 on the outer face of the branch 115 and serves as connector for a derailleur operating mechanism (not shown) intended to effect the displacement of the chain guide. The cutout 120 in the plate 117 is provided to correspond to the heel 123 of the strap 121 and the plate 117 bearing against the outer face of the branch 115 in the position of rest. The plate 117 matches the shape of the branch 115 and has a step 119 at the level of a bottom edge 134 of the branch 115 so that the inner face of that portion of the plate 117 which is situated below the branch 115 will be in line with the inner face of the branch 115. At their rear portion the branches 115, 116 are connected by a bolt 127 similar to the bolt 27 in FIG. 2, and in the median zone of their upper edges they are connected by a bridge 133 similar to the bridge 33 in FIG. 3. The branches 115, 116 have respective extensions 135, 136 at their front portions. The extensions 135, 136 are joined by a bridge 137 in such a manner as to constitute a rounded beak having no sharp edges. The beak which imparts great rigidity to the assembly comprising the branches 115 and 116, eliminates the projecting edges of the front ends of the branches of the conventional derailleur chain guide, and thus prevents any accidental injury to the user, particularly in the event of a fall. The beak serves solely to protect the user and plays no part in the movement of the chain. The beak is in fact formed in line with the curvature of the upper edges of the branches 115, 116 and has a slight height, for example of the order of 2 to 5 mm, so that a free space is provided under the beak and the extensions of the bottom edges of the branches 115, 116, particularly the extension of the edge 134 of the branch 115. In this manner the chain and the largest sprocket wheel never come into contact with the beak, but pass beneath it.

The plate 117 has a front portion 118 which extends the median and front portions of the branch 115 and takes up position under the extension 135 of the branch 115. The front portion 118 is situated in line with the branch 115, or is preferably slightly inclined towards the interior of the chain guide, as shown in FIG. 8.

Operation of this chain guide is similar to that of the chain guide shown in FIGS. 2 to 5. When the chain has to pass from a small sprocket wheel to the large sprocket wheel, the chain comes to bear firstly against the branch 115 and then against the front portion 118 of the plate 117. When the links arrive between the teeth of the large sprocket wheel and the front portion 118, the latter retracts slightly in the outward direction because of the elasticity of the plate 117 due to its nature and to the fact that it is fixed to the branch 115 only by one or more connecting elements 126 remote from the front portion 118. A retracted position 117a of the plate 117 and a retracted position 118a of the front portion 118 are shown in broken lines in FIG. 8. Because of the retraction of the plate 117 the links of the chain are never jammed between the large sprocket wheel and a branch of the chain guide, and can engage without difficulty in the large sprocket wheel.

A third embodiment of a derailleur chain guide according to the present invention, which is shown in FIGS. 9 to 11, is very similar to that shown in FIGS. 6 to 8.

Referring in particular to FIG. 9, the chain guide comprises two branches 215, 216 connected at their rear parts by a bolt 227, in their middle part by a bridge 233 connecting part of the top edges of each of the branches 215, 216, and in their front part by a rounded beak or head consisting of a bridge 237 connecting extensions 235, 236 of the front ends of the two branches 215, 216 respectively. A strap 221 is fixed by a heel 223 on the outer face of the branch 215.

A right-angled attachment piece or plate 217 is attached to the outer face of the front portion of the branch 215. The steel of which the plate 217 is made and the thickness of the plate are such that it has a certain elasticity. One arm of the plate 217 is fixed to the strap 221 by means of a connecting element 226, while the other arm, which is free, is applied against the branch 215 and matches the shape of the latter. The plate 217 thus has a slightly projecting portion 220 which corresponds to the heel 223 of the strap 221 forming the connection to a derailleur operating mechanism (not shown). The face of the plate 217 lying against the branch 215 also has, as in the previous embodiments, a step 219 level with the bottom edge of the branch 215 and its extension 235, so that the inner face of the portion of the plate 217 which is situated under the branch 215 and the inner face of the front portion 218 of the plate 217 situated under the extension 235 of the branch 215 are in the plane of the inner face of the branch 215. Nevertheless, as can be seen in FIG. 11, the front portion 218 may also be inclined towards the interior of the chain guide.

In the chain guide shown in FIG. 9 the plate 217 partly covers and bears against the extension 235 of the branch 215, which extension constitutes an edge of the head 235, 236, 237. The plate 217 could however have a top edge contiguous with the lower edge of the extension 235, without covering the latter. Similarly, the front bottom edge 238 which is intermediate between the bottom edge 234 of the branch 215 and the bottom edge of the extension 235 is shown in FIG. 9 as sharply inclined in relation to the vertical. The front bottom edge 238 may however have a more or less sharp slope and in the limit case may be vertical. The edge 238 could also be curved. Thus, the dimensions and the shape of the plate 217 and also the profile of the bottom edges of the branch 215 may be adapted to the applications contemplated and to the characteristics (number of sprocket wheels, diameters of the various sprocket wheels, ratio between the smallest and the largest sprocket wheels) of the crank gear on which the chain guide has to be mounted.

It is possible for the extent of the zone in which the chain must bear against the rigid part (the branch 215) and the extent of the zone in which the chain has to bear against a part having a certain elasticity and adapted to retract slightly in order to prevent wedging (part of the plate 217 which projects beyond the branch 215) to be selected as desired.

The elasticity of the plate 217 may be modified either by moving the element 226 fastening the plate 217 to the branch 215 or to a piece attached to the branch 215, for the purpose of fixing the plate 217 at a point at a longer or shorter distance from the free front portion 218 of the plate 217, or by modifying the nature of the material of which the plate 217 is made or modifying the thickness of that piece.

The operation of the chain guide shown in FIGS. 9 to 11 is strictly in conformity with that of the chain guide shown in FIGS. 6 to 8. The retracted position of the plate 217 and of its front portion 218 are shown in broken lines in FIG. 11 and given the references 217a and 218a.

The different embodiments of the invention described above relate to chain guides in which the front portion 18, 118, 218 which is adapted to retract slightly when the chain comes to bear against it, is a part of a plate 17, 117, 217 attached to the outer face of the branch 15, 115, 215.

In a particular embodiment of the invention the branch 15, 115, 215 and the front portion 18, 118, 218 may be composed of a single piece comprising a body of stiffened steel whose shape, constitution, and dimensions may be similar to those of the branch 15, 115, 215, and an additional part formed from flexible steel, whose shape and dimensions may be similar to those of the front portion 18, 118, 218 of the plate 17, 117, 217. In this case the boundary between the additional part and the body of the branch formed in this way, which corresponds to the step 19, 119, 219 in the drawings, is slit or notched over part of its length in order to enable the said additional part to move slightly away from the body of the branch when the chain comes to bear against the additional part.

In this last-mentioned embodiment the chain guide composed of two branches, of which one is flexible over part of its length and which are joined by one or more bridges, may be formed of a single pressing.

What is claimed is:

1. A front derailleur chain guide comprising: a first branch and a second branch which are substantially parallel and each of which consists of a rigid body in the form of an elongated plate curved in the longitudinal direction and spaced apart from one another in such a manner as to form between them a free space larger than the width of a chain, and joined to one another by a bridge connecting a part of an edge of each branch, the second branch, being offset in relation to the first branch in such a manner as to be able during operation to come above a larger sprocket wheel without touching it, the first branch having a further member which projects at least forwards of and/or below a front portion of the first branch and to which a certain elasticity is imparted so that it can move slightly away from the first branch when the chain comes to bear against the said further member.

2. A front derailleur chain guide as claimed in claim 1 in which the further member comprises a part of an additional piece attached to an outer surface of the first branch.

3. A front derailleur chain as claimed in claim 2 in which the further member covers the entire surface of the first branch to which it is attached.

4. A front derailleur chain guide as claimed in claim 2 in which the further member only partly covers the surface of the first branch to which it is attached.

5. A front derailleur chain guide as claimed in claim 1 in which the further member has a front end slightly inclined inwards in relation to the said first branch.

6. A derailleur chain guide as claimed in claim 2 in which the additional piece is rigid, is fixed to the first branch at a point remote from a leading portion thereof, is free at its leading portion which constitutes the said further member, and is subjected, in its median zone, to elastic pressure applied by a spring.

7. A front derailleur chain guide as claimed in claim 2, in which the additional piece is flexible, is free at a leading part thereof, and is fixed to the first branch at a point remote from a leading end of the first branch.

8. A front derailleur chain guide as claimed in claim 1 in which the first and second branches have their top edges joined by a bridge at a leading end.

9. A front derailleur chain guide as claimed in claim 8 in which the bridge constitutes a curved beak.

10. A front derailleur chain guide as claimed in claim 2 in which a bottom edge of the additional piece is outwardly curved.

11. A front derailleur chain guide as claimed in claim 2 in which the additional piece is shaped to the shape of the first branch.

12. A front derailleur chain guide as claimed in claim 7 in which the additional piece has a rear portion curved in the form of a wing fixed on a lug joined to the body of the said first branch.

13. A front derailleur chain guide as claimed in claim 1 in which the first branch is composed of a single piece whose body is formed from a stiffened steel, and the further member is formed from a flexible steel, and a portion of the boundary between the body and the first branch being slit or notched.

* * * * *